(12) United States Patent
Koma et al.

(10) Patent No.: US 8,319,927 B2
(45) Date of Patent: *Nov. 27, 2012

(54) LIQUID CRYSTAL DISPLAY DEVICE

(75) Inventors: Norio Koma, Gifu (JP); Kazuhiro Inoue, Mizuho (JP); Masashi Mitsui, Gifu (JP)

(73) Assignee: Sanyo Electric Co., Ltd. (JP)

( * ) Notice: Subject to any disclaimer, the term of this patent is extended or adjusted under 35 U.S.C. 154(b) by 191 days.

This patent is subject to a terminal disclaimer.

(21) Appl. No.: 12/851,140

(22) Filed: Aug. 5, 2010

(65) Prior Publication Data

US 2010/0315581 A1    Dec. 16, 2010

Related U.S. Application Data

(63) Continuation of application No. 11/289,068, filed on Nov. 29, 2005, now Pat. No. 7,796,219.

(30) Foreign Application Priority Data

Nov. 30, 2004  (JP) ................................. 2004-345222
Nov. 22, 2005  (JP) ................................. 2005-337876

(51) Int. Cl.
*G02F 1/1343* (2006.01)
(52) U.S. Cl. ....................................................... 349/129
(58) Field of Classification Search ................... 349/129
See application file for complete search history.

(56) References Cited

U.S. PATENT DOCUMENTS

| | | | |
|---|---|---|---|
| 6,229,589 B1 | 5/2001 | Koma | |
| 6,342,938 B1 | 1/2002 | Song et al. | |
| 6,356,335 B1 | 3/2002 | Kim et al. | |
| 6,369,870 B1 | 4/2002 | Koma | |
| 6,567,144 B1 | 5/2003 | Kim et al. | |
| 6,661,488 B1 | 12/2003 | Takeda et al. | |
| 6,970,220 B2 | 11/2005 | Park et al. | |

FOREIGN PATENT DOCUMENTS

| | | |
|---|---|---|
| KR | 1999-006951 A | 1/1999 |
| KR | 1999-0036740 A | 5/1999 |

OTHER PUBLICATIONS

Japanese Patent Laid-Open Publication No. Hei 7-311383 and its English Abstract.

Notice of Grounds for Rejection for the corresponding Korean Patent Application No. 10-2005-114580 mailed Dec. 13, 2006 with English translation.

Form PTO-892 from Office Action for U.S. Appl. No. 11/289,068 dated Oct. 29, 2007.

Form PTO-892 from Office Action for U.S. Appl. No. 11/289,068 dated May 5, 2008.

Form PTO-892 from Office Action for U.S. Appl. No. 11/289,068 dated Jul. 21, 2009.

*Primary Examiner* — James Dudek (74) *Attorney, Agent, or Firm* — Cantor Colburn LLP (57) ABSTRACT

An orientation controller which divides a pixel into a plurality of different priority alignment regions and an additional orientation controller are provided in a pixel. The additional orientation controller is provided at least at an end of a pixel of a long-side alignment region formed along the long side of the pixel among the divided alignment regions, for example, around a center position of the long side of the pixel. The additional orientation controller can be realized, for example, by forming a cutout pattern in a side of a first electrode (pixel electrode) forming a part of the pixel. Because the alignment direction is also controlled by the additional orientation controller, the alignment of liquid crystal in this region is stabilized.

6 Claims, 6 Drawing Sheets

LIQUID CRYSTAL DISPLAY DEVICE

CROSS-REFERENCE TO RELATED APPLICATION

The present application is a continuation of U.S. patent application Ser. No. 11/289,068, filed on Nov. 29, 2005, the entire contents of which are incorporated herein by reference. The Ser. No. 11/289,068 application claimed the benefit of the date of the earlier filed Japanese Patent Application Nos. 2004-345222 and 2005-337876, filed Nov. 30, 2004 and Nov. 22, 2005, respectively.

BACKGROUND OF THE INVENTION

1. Field of the Invention

The present invention relates to a liquid crystal display device having an orientation controller which divides a direction of alignment of liquid crystal within a pixel region.

2. Description of the Related Art

Because liquid crystal display devices (hereinafter simply referred to as "LCD") have advantages such as a thin thickness and low power consumption, the LCDs are widely in use as a computer monitor and a monitor for a portable information device or the like. In the LCD, liquid crystal is sealed between a pair of substrates and display is realized by controlling, using electrodes formed on the substrates, alignment of the liquid crystal positioned between the electrodes.

TN (Twisted Nematic) liquid crystal is known as the liquid crystal in such an LCD. In the LCD which uses the TN liquid crystal, an alignment film to which a rubbing process is applied is formed on a contact surface, which faces the liquid crystal, of each of the pair of substrates. When no voltage is applied, the TN liquid crystal which has a positive dielectric constant anisotropy is initially aligned such that the major axis of the molecules is aligned along the direction of rubbing of the alignment film. In many cases, the initial alignment of the liquid crystal is not completely along the plane of the substrate, but a pretilt is applied in advance. That is, the major axis of the molecule is tilted by a predetermined angle from the plane of the substrate.

The rubbing direction of the alignment film on one substrate and the rubbing direction of the alignment film on the other substrate are configured so that the rubbing directions are 90° twisted from each other and the liquid crystal is aligned with a twist of 90° between the pair of substrates. When a voltage is applied to the liquid crystal between the electrodes by the electrodes formed on the opposing surfaces of the pair of substrates, the major axis direction of the liquid crystal molecule is changed toward the direction of normal of the plane of the substrate and the state of the twisted alignment is resolved.

Linear polarizer plates having polarization axes that are perpendicular to each other are provided on the pair of substrates. The rubbing direction of the alignment film is set along the direction of the polarization axis of the polarizer plate on the corresponding substrate. Because of this structure, when no voltage is applied, linearly polarized light entering the liquid crystal layer through a polarizer plate on the side of the substrate placed near a light source becomes, in the liquid crystal layer which is aligned with the twist of 90°, linearly polarized light having the polarization axis different by 90°. The converted linearly polarized light transmits through the polarizer plate which is provided on the side of the other substrate and which allows transmission of only linearly polarized light having the polarization axis at a direction 90° different from that of the polarizer plate at the side of entrance of the light. Thus, the light from the light source transmits through the LCD and "white" is displayed. When, on the other hand, a voltage is applied between the electrodes so that the twisted alignment of the liquid crystal is completely resolved and the liquid crystal molecules are aligned with the direction of normal of the plane of the substrate, the linearly polarized light entering the liquid crystal layer from the side near the light source reaches the polarizer plate provided on the other substrate without a change in the polarization in the liquid crystal layer, and thus, the polarization does not match the polarization axis of the linearly polarized light of the polarizer plate on the emission side, the light cannot transmit through the polarizer plate on the emission side, and "black" is displayed. Gray scales are expressed by adjusting the amount of light which can transmit through the polarizer plate at the emission side through application, to the liquid crystal layer, of a voltage which does not completely resolve the twisted alignment of the liquid crystal layer to convert a portion of the linearly polarized light entering the liquid crystal layer to the linearly polarized light having the polarization axis which is 90° different.

An LCD which uses a vertically aligned (VA) liquid crystal (hereinafter simply referred to as "VA liquid crystal") is also known in addition to the TN liquid crystal. In the VA liquid crystal, the liquid crystal has, for example, a negative dielectric constant anisotropy and the major axis of the liquid crystal molecule is directed along a vertical direction (direction of normal of the plane of the substrate) when no voltage is applied because of a vertical alignment film. In an LCD which uses the VA liquid crystal, polarizer plates having polarization axes different from each other by 90° are provided on the pair of substrates. When no voltage is applied, linearly polarized light entering the liquid crystal layer through the polarizer plate on the side of the substrate placed near the light source reaches the polarizer plate on the substrate on the viewing side without a change in the polarization state because the liquid crystal is vertically aligned and birefringence does not occur in the liquid crystal layer. Thus, the light cannot transmit through the polarizer plate on the viewing side and "black" is displayed. When a voltage is applied between the electrodes, the VA liquid crystal changes so that the major axis of the molecule is tilted towards the direction of plane of the substrate. Because the VA liquid crystal has a negative optical anisotropy (index of refraction anisotropy), the minor axis of the liquid crystal molecule is tilted toward the direction of normal of the plane of the substrate and the linearly polarized light entering the liquid crystal layer from the side of the light source is changed by birefringence in the liquid crystal layer so that the linearly polarized light becomes elliptically polarized as the light transmits through the liquid crystal layer. The elliptically polarized light further becomes circularly polarized light, elliptically polarized light, or linearly polarized light (all of the polarized light has the polarization axis 90° different from the linearly polarized light which enters the liquid crystal). Because of this configuration, when all of the entering linearly polarized light becomes linearly polarized light which is different by 90° due to birefringence in the liquid crystal layer, all of the linearly polarized light transmits through the polarizer plate on the substrate on the viewing side, and the display becomes "white (maximum brightness)". The amount of birefringence is determined by a degree of tilt of the liquid crystal molecule. Therefore, depending on the amount of birefringence, the entering linearly polarized light becomes elliptically polarized light having the same polarization axis, circularly polarized light having the same polarization axis, or elliptically polarized light having a polarization axis which differs by 90°, the transmittance of the polarizer plate on the emission side is determined by the polarization state, and a display of a gray scale is obtained.

Figure 1A:
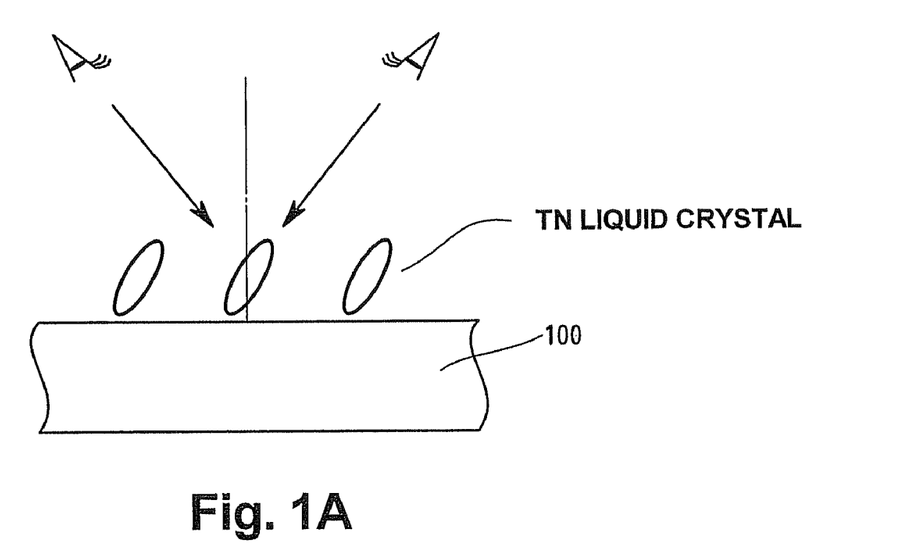
FIGS. 1A and 1B are diagrams for explaining a relationship between an alignment state and a viewing angle of liquid crystal molecules.

As described, in the LCD of TN liquid crystal, a degree of tilt, from the pretilt angle, of the direction of the major axis of the liquid crystal molecule with respect to the direction of the plane of the substrate is controlled and the slope of the liquid crystal molecule with respect to the viewer when the TN LCD is viewed from the upper right side of the figure significantly differs from the slope of the liquid crystal molecule with respect to the viewer when the TN LCD is viewed from upper left side, as shown in FIG. 1A. Therefore, TN liquid crystal is known to have a large viewing angle dependency and frequent occurrence of coloring and inversion of display. In other words, the TN liquid crystal is known to have a narrow viewing angle which allows view of a normal display.

In order to enlarge the angle of view, Japanese Patent Laid-Open Publication No. Hei 7-311383, for example, proposes dividing the alignment direction of the liquid crystal in one pixel region, that is, formation of an orientation controller in a pixel and division of the direction of the major axis direction of the liquid crystal molecule (liquid crystal director) in a pixel region.

Figure 1B:
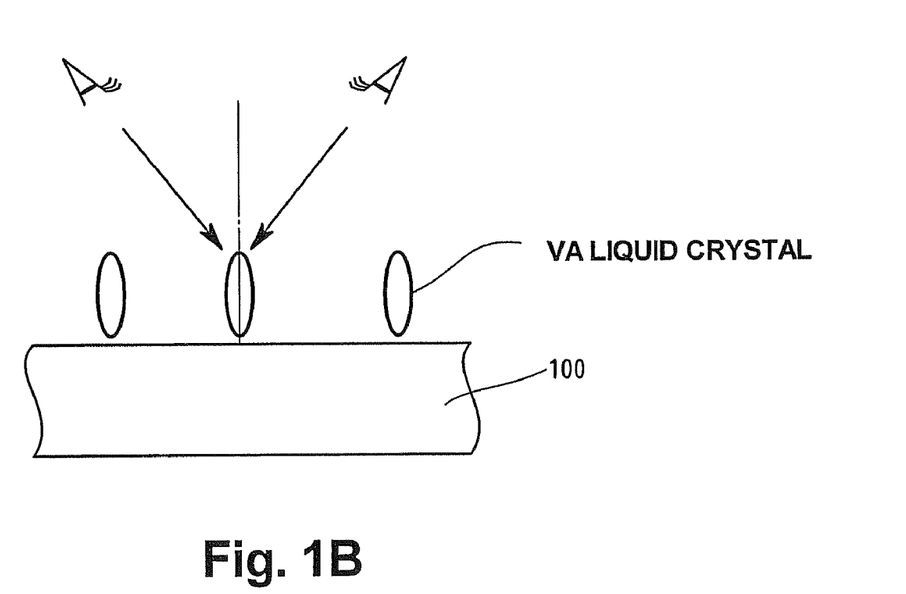

In the VA liquid crystal, on the other hand, as shown in FIG. 1B, the initial alignment is along the direction of normal of the substrate 100, and the difference in the angle of slope of the liquid crystal molecule with respect to the direction of normal is small between a case when the display is viewed from the upper right of the drawing or from the upper left of the drawing. Therefore, compared to the TN liquid crystal, the viewing angle dependency is fundamentally low. In other words, the VA liquid crystal has a characteristic of a wide angle of view. In the VA liquid crystal, however, the direction of the tilt of the liquid crystal molecule from the vertical direction (alignment vector) is not uniquely determined when the voltage is applied, and there is a problem in that a boundary between regions of different alignment directions within one pixel region (disclination line) is not fixed. When the position of the disclination line differs depending on the pixel or changes as time elapses, non-uniformity in display or the like occurs and the display quality is degraded.

In consideration of this problem, references such as Japanese Patent Laid-Open Publication No. Hei 7-311383 disclose provision of the orientation controller in one pixel to fix the disclination line on the orientation controller also in the VA liquid crystal, so that the viewing angle is further enlarged and the display quality is improved.

With the orientation controller as described above, the direction of the initial alignment of the liquid crystal molecule can be controlled so that the occurrence of the disclination line at a random position is prevented and the viewing angle can be enlarged. However, there is a strong demand for further improvement in the display quality and further improvement in responsiveness.

SUMMARY OF THE INVENTION

The present invention advantageously realizes a superior alignment control.

According to one aspect of the present invention, there is provided a liquid crystal display device comprising a first substrate having a first electrode and a second substrate having a second electrode in which surfaces of the first substrate and the second substrate on which the first electrode and the second electrode are formed are placed opposing each other with a liquid crystal layer therebetween, wherein each pixel region has a shape of a polygon, comprises an orientation controller which controls an alignment direction of liquid crystal, and is divided into a plurality of alignment regions by the orientation controller, and in an alignment region having an end matching an end of the pixel region among the plurality of alignment regions, an additional orientation controller is provided on the end of the pixel region.

According to another aspect of the present invention, it is preferable that, in the liquid crystal display device, the additional orientation controller is formed at an approximate center position of the end of the pixel region forming a part of at least one of the alignment regions.

The additional orientation controller can be provided at an approximate center of a longest edge among the edges of the pixel region. The additional orientation controller can be provided projecting from a side of the pixel region toward the inside of the pixel region.

According to another aspect of the present invention, it is preferable that, in the liquid crystal display device, the pixel region has a rectangular shape, the orientation controller comprises a linear portion which extends parallel to a direction along a long side of the pixel region and V-shaped portions which extend from ends of the linear portion toward vertices of the pixel region or a side of the pixel region, and the additional orientation controller is provided at an end along the long-side direction of the pixel region.

The additional orientation controller can be formed by cutting a portion of an electrode in correspondence to the shape of each pixel region. The shape of a cutout may be, for example, a triangle, a trapezoid, etc.

According to another aspect of the present invention, there is provided a liquid crystal display device comprising a first substrate having a first electrode and a second substrate having a second electrode in which surfaces of the first substrate and the second substrate on which the first electrode and the second electrode are formed are placed opposing each other with a liquid crystal layer therebetween and a display portion has a plurality of pixels arranged in a matrix form, wherein each pixel comprises an orientation controller which divides a pixel region into a plurality of alignment regions having different priority alignment directions, the first electrode is formed in a polygonal shape and in an individual pattern for each pixel, with an edge of the first electrode functioning as a part of the orientation controller, and an additional orientation controller which stabilizes an alignment around a center of a predetermined alignment region divided by the orientation controller is provided at least near an edge in a direction along a long side of the first electrode.

By adding an additional orientation controller in addition to the orientation controller which divides each pixel region into a plurality of alignment regions, occurrence of a disclination line at a random position is inhibited and the display quality can be improved.

BRIEF DESCRIPTION OF THE DRAWINGS

Preferred embodiments of the present invention will be described in detail by reference to the drawings, wherein.

DESCRIPTION OF THE PREFERRED EMBODIMENTS

Figure 2:
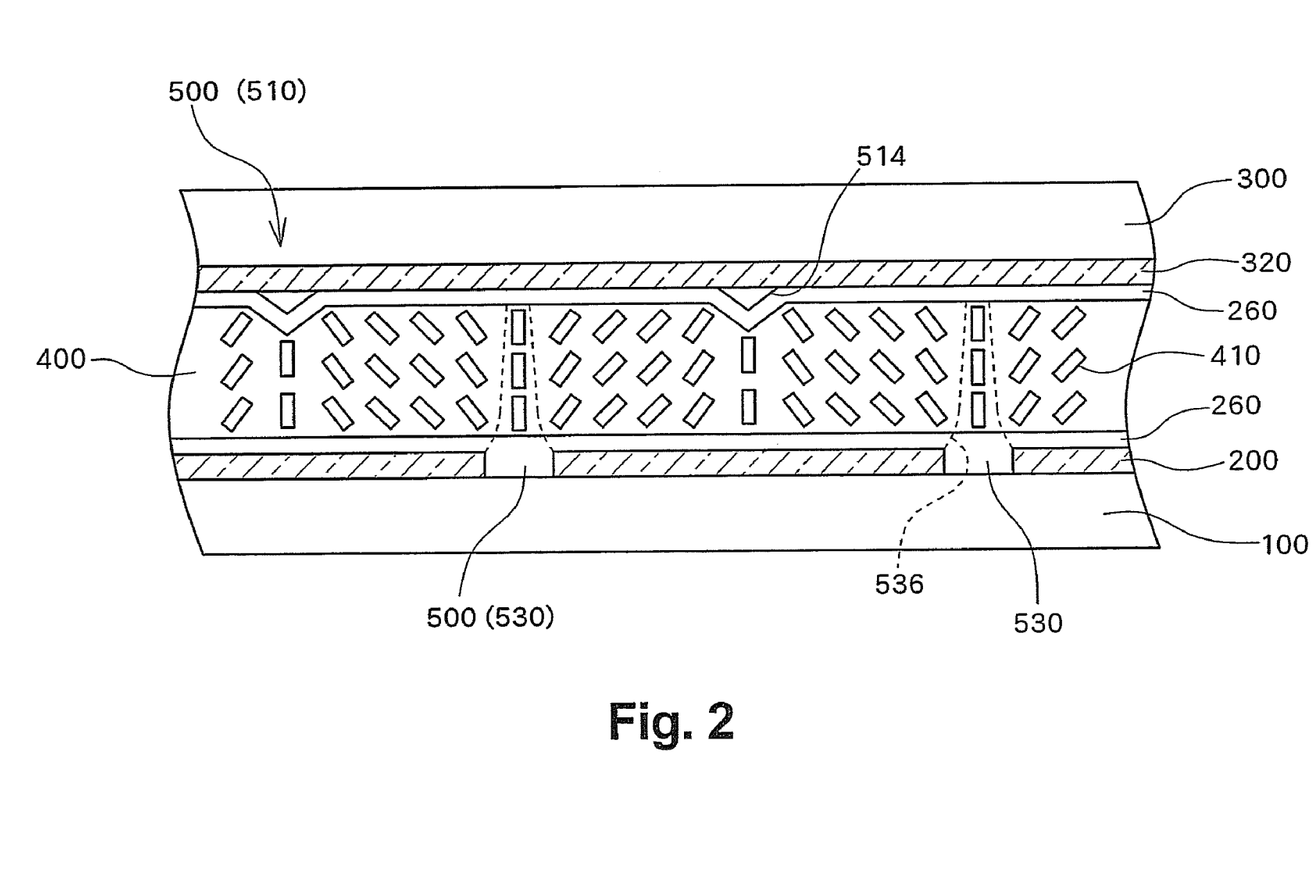
FIG. 2 is a schematic cross sectional diagram of a liquid crystal display device according to a preferred embodiment of the present invention.

Preferred embodiments of the present invention will now be described referring to the drawings. FIG. 2 schematically shows a cross sectional structure of an LCD according to a preferred embodiment of the present invention. FIG. 2 shows a cross section of a transmissive region of a transflective LCD which has, in one pixel, a transmissive region in which display is achieved by allowing light from a light source to transmit through and a reflective region in which display is achieved by reflecting light from the outside.

In an LCD shown in FIG. 2, a liquid crystal layer 400 is formed by sealing liquid crystal between a first substrate 100 and a second substrate 300 which are both transparent and in which, for example, a glass substrate or the like is used. A first electrode 200 and a second electrode 320 which are made of a transparent conductive material such as ITO (Indium Tin Oxide) and IZO (Indium Zinc Oxide) are formed respectively on surfaces of the substrates 100 and 300, opposing the liquid crystal layer 400. A transmissive LCD in which the display is achieved by allowing light from a light source to transmit through is formed with a cross sectional structure similar to that shown in FIG. 2.

As the liquid crystal layer 400, vertical alignment type liquid crystal having a negative dielectric constant anisotropy is used and an orientation controller 500 (orientation divider) which divides one pixel region into a plurality of alignment regions is provided on the side of the second substrate 300 and the side of the first substrate 100. Among the orientation controllers 500, on the side of the first substrate 100, an electrode-absent portion 530 which is formed by a gap between the first electrodes 200 is formed. An alignment film 260 made of polyimide or the like is formed over the entire surface of the substrate covering the electrode-absent portion 530 and the first electrode 200.

On the side of the second substrate 300, a projection 514 which projects toward the liquid crystal layer 400 is formed on the second electrode 320. An alignment film 260 similar to the alignment film on the side of the first substrate 100 is formed over the entire surface covering the projection 514 and the second electrode 320. The alignment films 260 on the first substrate side and the second substrate side are both vertical alignment films and a rubbing-less type alignment film can be employed.

In the above-described structure, in the orientation controller 510 on the side of the second substrate 300, when no voltage is applied between the first electrode 200 and the second electrode 320, the liquid crystal director 410 is aligned perpendicular to a tilted surface of the alignment film 260 formed by a tilted surface of the projection 514 having a triangular cross sectional shape.

When application of a voltage between the first electrode 200 and the second electrode 320 is started, near the orientation controller 510 on the side of the second electrode 320, the liquid crystal director which is tilted in advance by the alignment control is tilted toward a direction further tilted from the direction of normal of the plane of the substrate. Therefore, in the orientation controller 510, due to an action of the projection 514, the alignment direction of the liquid crystal is divided into a plurality of domains which are directed to alignment directions at least differing from each other, with the orientation controller 510 being the boundary of division.

In the electrode-absent portion 530 formed in a gap between the first electrodes 200 on the first substrate side, when a voltage starts to be applied (when a weak electric field is applied), the electric force line is formed as shown by the dotted line in the drawing. The liquid crystal director is tilted in a direction perpendicular to the electric force line, that is, the minor axis of the liquid crystal is tilted in a direction approximately matching the electric force line. Although an initial alignment at the electrode-absent portion 530 is approximately perpendicular to the first substrate 100, because the electric field line is tilted, the alignment direction (alignment orientation) of the liquid crystal can be controlled. The alignment direction of the liquid crystal is divided into directions differing from each other, with the electrode-absent portion 530 being the boundary of the division.

Figure 3A:
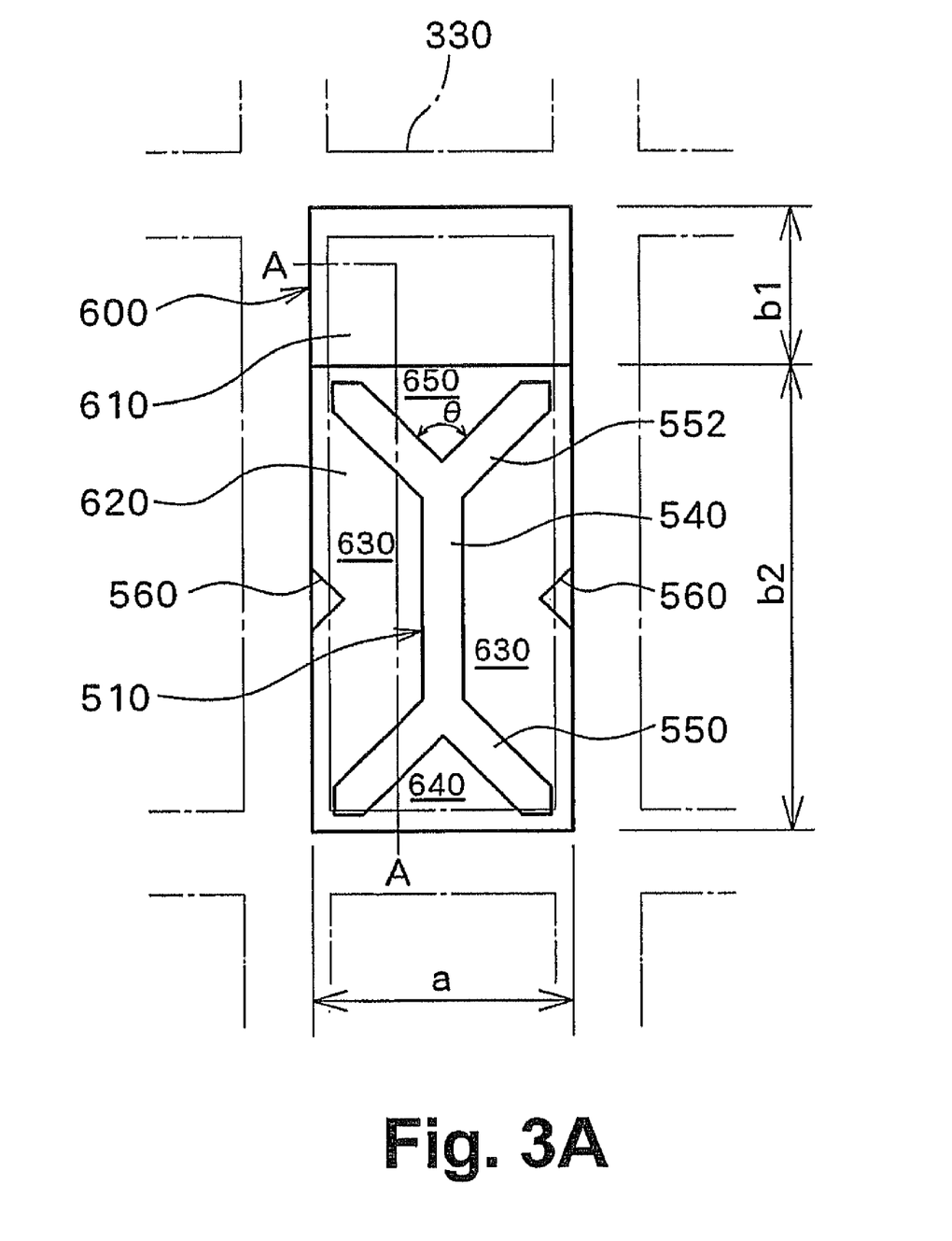
FIG. 3A is a diagram for explaining a planar structure of a pixel of a liquid crystal display device according to a preferred embodiment of the present invention.
Figure 3B:
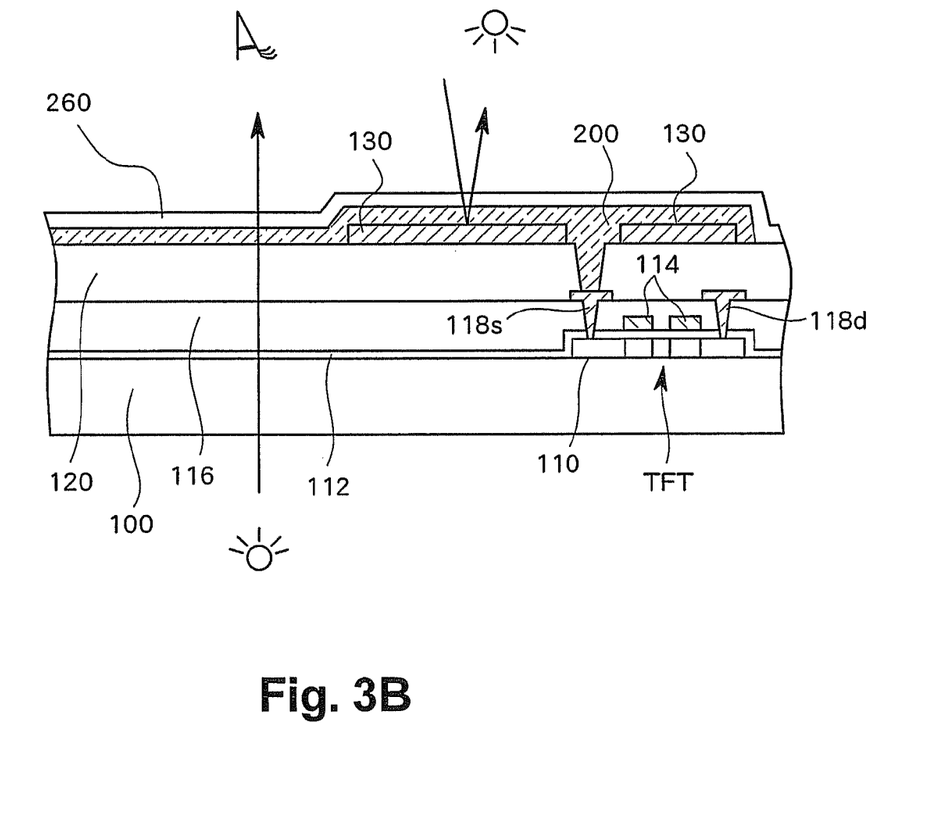
FIG. 3B is a diagram for explaining a cross sectional structure of a side of a first substrate along the A-A line of FIG. 3A.

FIG. 3A is a diagram for explaining a planar structure of a transflective LCD according to a preferred embodiment of the present invention and shows a positional relationship between a first electrode 200 provided on the side of the first substrate 100 and the orientation controller 510 provided on the side of the second substrate 300. FIG. 3B is a diagram schematically showing a cross sectional structure on the side of the first substrate in a pixel 600 along the A-A line of FIG. 3A.

The LCD shown in FIGS. 3A and 3B is an active matrix LCD and a switching element such as a thin film transistor (TFT) is provided in each of a plurality of pixels arranged in the display region in a matrix form. A first electrode (pixel electrode) 200 which is formed in an individual pattern for each pixel is electrically connected to the switching element (hereinafter simply referred to as "TFT"). The first electrode 200 is patterned to a rectangular shape (quadrangle shape) having a partial cutout portion, as will be described.

Each pixel 600 of such an active matrix LCD is formed in a region of overlap of the first electrode 200 which is individually formed for each pixel and a second electrode (common electrode) 320 which opposes the first electrode 200 with the liquid crystal layer 400 therebetween and which is formed to be common to the pixels. Because of this structure, each pixel 600 has a shape of a rectangle which substantially matches the shape of the first electrode 200. A light shielding layer (BM) 330 which is made of a light blocking material is formed on the side of the second substrate 300 in order to prevent light leakage between adjacent pixels, and an opening of the light shielding layer 330 shown in FIG. 3A by a dotted chain line defines an outer edge of the display region in each pixel. In a full-color display, the pixel 600 displays one color of red, green, blue, and sometimes white, to which the pixel is associated. The pixel 600 comprises a reflective region 610 in which the display is realized by reflecting an external light (light from the viewing side) and a transmissive region 620 in which the display is realized by allowing light from a light source which is placed at a position behind the panel, etc., to transmit through.

The TFT is formed on the first substrate 100 in which, for example, glass is used. A crystalline silicon layer such as low temperature polycrystalline silicon obtained by laser annealing or the like or an amorphous silicon layer, which is formed in an island-like manner, is used for the active layer 110 of the TFT. A gate insulating layer 112 having a two-layer structure of $SiO_2/SiN$, for example, is formed covering the active layer 110. A gate electrode 114 is formed above the gate insulating layer 112 at a position corresponding to the channel formation region of the active layer 110 of the TFT using a refractory metal material such as Cr. In the configuration of FIG. 3A, the TFT provided in each pixel has a double gate structure (a structure in which two channel regions are connected in series with respect to a carrier path between the source and the drain of the TFT) having a high leakage current preventing function.

An interlayer insulating layer 116 having a layered structure of $SiO_2/SiN$ is formed over the entire surface of the substrate covering the gate electrode 114, contact holes are formed through the interlayer insulating layer 116 and the gate insulating layer 112 in regions corresponding to the source and drain of the active layer 110 of the TFT, and a source electrode 118s and a drain electrode 118d are formed using Al or the like to connect to the source region and the drain region of the active layer 110, respectively. The drain electrode 118d is connected to a data line which supplies a data signal to pixels along the column direction among the pixels which are arranged in a matrix form, and in the exemplified configuration, the data line also functions as the drain electrode 118d.

The gate electrode 114 is electrically connected to a selection line for selecting pixels along the row direction among the pixels which are arranged in a matrix form, and in the exemplified configuration, the selection line also functions as the gate electrode 114. A planarizing insulating layer 120 made of an organic insulating resin, an inorganic insulating resin, or the like is formed over the entire surface of the substrate covering the source electrode 118s and the drain electrode 118d, and a reflective layer 130 having a superior reflection characteristic such as, for example, Al is selectively formed through patterning on a region of the planarizing insulating layer 120 corresponding to the reflective region 610 of each pixel. A first electrode 200 made of ITO or the like and having an individual pattern for each pixel is formed covering the reflective layer 130. As has already been explained with respect to FIG. 2, the alignment film 260 made of polyimide or the like is formed over the entire surface of the substrate covering the first electrode 200.

A contact hole is formed in a region of the planarizing insulating layer 120 corresponding to the source electrode 118s and the first electrode 200 is connected to the source electrode 118s and to the source region of the active layer 110 of the TFT through the source electrode 118s. Although the reflective region 610 is formed between the planarizing insulating layer 120 and the first electrode 200 in the exemplified configuration of FIG. 3B, the present invention is not limited to such a configuration and the reflective region 610 may alternatively be formed between the first electrode 200 and the alignment film 260.

Regarding the size of each pixel 600 formed between the side of the first substrate 100 having a cross sectional structure as described and the second substrate 300 which is placed opposing the first substrate 100, for example, it is possible to employ a size with a ratio of a shorter side (for example, along the horizontal scan direction) and a longer side (for example, along the vertical scan direction) being 3:1 to 2:1. More specific example would have a size a along the horizontal scan direction (H direction) of approximately 46 μm and a size b (=b1+b2) along the vertical scan direction (Vdirection) of 124 μm. In this example configuration, the aspect ratio is 2.7:1. A ratio of the vertical sides (V direction) of the reflective region 610 and the transmissive region 620 is determined based on the desired reflective functionality, and is approximately 1:2 to 1:3, for example. In an example configuration, the V direction length b1 of the reflective region 610 and the V direction length b2 of the transmissive region 620 are approximately 37 μm and approximately 87 μm, respectively, and thus the ratio is 1:2.35.

In the example configuration of FIG. 3A, the orientation controller 510 is provided only in the transmissive region 620 because a thickness of the liquid crystal layer is relatively thin in the reflective region compared to that in the transmissive region and it is difficult to place the orientation controller 510 which is a projection in the reflective region. The thickness of the liquid crystal layer in the reflective region is thin because the optical path length of light transmitting through the liquid crystal layer is adjusted in order to match a phase difference caused in the liquid crystal layer between two regions. In other words, in the reflective region, the light transmits through the liquid crystal layer twice, that is, a first time when the light enters the liquid crystal layer and a second time when the light is reflected, and therefore, the optical path length is balanced between the reflective region and the transmissive region by thinning the liquid crystal layer in the reflective region. Alternatively, it is also possible to separately form the orientation controller 510 in the reflective region 610 also.

The orientation controller 510 comprises a linear portion 540 which is parallel to a longer side of the pixel 600 and which extends approximately to a center of the pixel 600 and two V-shaped portions 550 and 552 which are connected to both ends of the linear portion 540 and which extend toward corners of the transmissive region 620. An angle θ formed by the two sides of the V-shaped portion depends on the aspect ratio of the pixel 600, and is approximately 90° in this example configuration. With the alignment dividing functionality of the orientation controller 510, the pixel 600 (in particular, the transmissive region 620) is divided into four regions having different priority alignment directions, with the orientation controller 510 being the boundary of the four regions. In other words, two alignment regions 630 surrounded by the right and left longer sides of the first electrode (pixel electrode) 200, the linear portion 540 of the orientation controller, and the V-shaped portions 550 and 552 of the orientation controller are formed on the right and left of the orientation controller 510, an alignment region 640 surrounded by a lower side (shorter side) of the first electrode 200 and the V-shaped portion 550 is formed, and an alignment region 650 surrounded by the V-shaped portion 552 and a boundary between the reflective region 610 and the transmissive region 620 is formed. The alignment regions 630 on the right and left are referred to as "long-side alignment regions", the alignment region 640 is referred to as a "lower-side alignment region", and the alignment region 650 is referred to as an "upper-side alignment region". As described, in each of the long-side alignment regions 630, a side of the first electrode 200, corresponding ones of left and right sides of the V-shaped portions 550 and 552 at the top and bottom of the orientation controller 510, and the linear portion 540 of the orientation controller 510, form the edges, and the overall shape of the long-side alignment region 630 is an approximate trapezoidal shape.

Because the shape of the region is elongated along the vertical scan direction, the central region of the long-side alignment region 630 is relatively distanced from the orientation controllers 550 and 552. In addition, because the alignment directions controlled by the upper and lower V-shaped portions 550 and 552 differ from each other, the alignment around the central region is not stabilized and a disclination tends to be generated at a random position near the center. In the present embodiment, an alignment controlling function is added to the portion of the long side of the first electrode 200 to inhibit the occurrence of a disclination at a random position in the central region of the long-side alignment region 630 along the vertical scan direction. Specifically, an additional orientation controller 560 is provided approximately around the center of the side formed by the long side of the first electrode 200 along the long side, among the edges of the long-side alignment region 630. The additional orientation controller 560 differs from the above-described orientation controller 510 on the side of the second electrode in that the additional orientation controller 560 does not completely divide the alignment of the pixel 600 in the corresponding region, but stabilizes the alignment direction in a region around the center of the long-side alignment region 630 in which the alignment direction of the liquid crystal is unstable. Although, unlike the linear portion 540 of the orientation controller 510, the additional orientation controller 560 does not clearly divide the priority alignment direction of the liquid crystal to left and right, an edge of the electrode which has an alignment controlling function is provided at a direction which is almost common with the V-shaped portions 520 and 550 so that disturbance in the alignment is prevented.

The additional orientation controller 560 may be formed by a triangular cutout portion formed in the first electrode 200, as shown in FIG. 3A. The triangle may be an isosceles right triangle with a height, that is, the amount of cut, being 3 μm. When the crossing angle θ of the V-shaped portions 520 and 550 of the orientation controller 510 is to be set to 90° as described, by forming the cutout portion in a shape of an isosceles right triangle, one side of the triangle can be set to be approximately parallel to one of the sides of the V-shape, and consequently, the alignment of the liquid crystal in the region surrounded by these sides matches, and occurrence of a clear disclination line and occurrence of the disclination line in a random position can be effectively inhibited. The cutout side of the cutout portion and the V-shaped portions 520 and 550 of the orientation controller 510 need not be completely parallel, and the advantage can be highly effectively achieved with these sides being close to parallel. Alternatively, it is also possible to provide a cutout portion of any shape to prevent occurrence of the disclination line at a random position, although such a configuration is inferior in its efficiency. In this manner, by cutting a portion of the long side of the first electrode 200, an initial alignment which is slightly tilted can be obtained in this portion by a principle similar to that of the electrode-absent portion 530, and occurrence of the disclination line at a random position can be inhibited. In this configuration, the advantages can also be obtained with the amount of cutout (cutout height) of approximately 5 μm. However, with this cutout amount, the electrode area is reduced and the aperture ratio (transmission ratio) is reduced, and therefore, the cutout amount is preferably set to 3 μm, which is small and which allows the advantage. Because the side of the first electrode 200 is covered by the light shielding layer 330 as shown in FIG. 3A in reality, the influence of the cutout process with the cutout amount of 3 μm on the aperture ratio is very small. When the additional orientation controller 560 is to be provided in the first electrode 200 as a cutout portion, the additional orientation controller 560 is not formed through an additional step after the first electrode 200 is patterned, but is simultaneously formed during patterning of the first electrode 200.

Alternatively, the additional orientation controller 560 may be formed as a projection formed on the second electrode 320 instead of the cutout portion of the first electrode. The projection may be formed similarly to the projection 514 of the orientation controller 510 which divides the pixel. Alternatively, it is also possible to form a projection on the corresponding portion on the long side of the first electrode 200, although such a configuration requires an additional step of formation.

Figure 4:
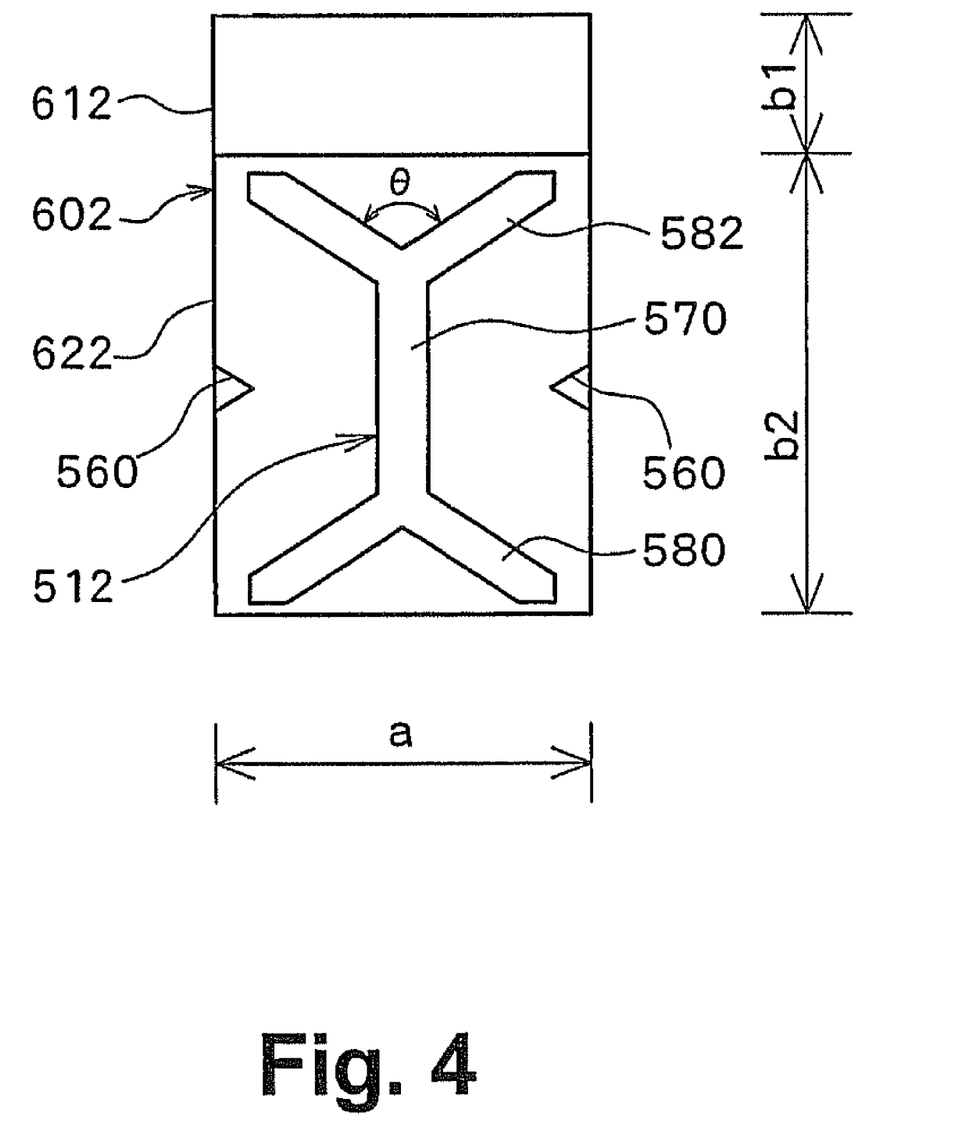
FIG. 4 is a diagram for explaining a planar structure of a pixel of a liquid crystal display device according to another preferred embodiment of the present invention.

FIG. 4 is a diagram showing another example shape of the pixel (first electrode 200). A pixel 602 of FIG. 4, that is, the shape of the first electrode 200, has a smaller aspect ratio of 2:1-1.5:1 compared to the first electrode 200 shown in FIG. 3A and the pixel 602 is wider and shorter, that is, the pixel 602 has a rectangular shape which is close to a square shape. The exemplified configuration is an example pixel in a transflective LCD, and thus, a reflective region 612 and a transmissive region 622 are provided in each pixel similar to the LCD of FIGS. 3A and 3B. A length a of a shorter side (H direction length) of the rectangle is approximately 65.5 μm and a length b (=b1+b2) of a longer side (V direction length) is 117 μm (=31 μm+86 μm). The aspect ratio in this configuration is 1.79:1. An orientation controller 512 which divides the alignment regions of the pixel 602 comprises a linear portion 570 and V-shaped portions 580 and 582. The crossing angle θ of the V-shape is larger than 90° and is, for example, 120°. The additional orientation controller 560 is provided near the center of the long side of the transmissive region 622 and has a shape of an isosceles triangle with a vertical angle of approximately 60°. The sides of the triangle and the sides of the V-shaped portions 580 and 582 are approximately parallel to each other.

The orientation controllers 510 and 512 which divide the alignment regions in the pixels 600 and 602 exemplified in FIGS. 3A and 4 are provided in the transmissive regions 620 and 622, respectively, but the present invention is not limited to such a configuration and the orientation controllers 510 and 512 may alternatively be provided in the reflective regions 610 and 612. In a reflective LCD in which the entire display region on the side of the first electrode 200 has the reflective function and in a transmissive LCD in which the entire display region on the side of the first electrode 200 has the transmissive function also, the shapes of FIGS. 3A, 3B, and 4 may be employed as the shape of the first electrode 200. The orientation controller 510 which is only formed in the transmissive region in the structures in FIGS. 3A, 3B, and 4 is placed so that the entire region of the first electrode 200 can be divided into a plurality of alignment regions. This can be achieved by, for example, extending the linear portion 540 in FIG. 3A, etc. In order to stabilize the alignment in the long-side alignment region formed along the linear portion 540, similar to the above-described configurations, an additional orientation controller 560 can be provided near the center of the long side of the first electrode 200 to achieve similar advantages. In the case of a reflective LCD, for example, the first electrode 200 is formed using a reflective conductive material such as Al or a reflective layer is provided below a first electrode 200 which is made of a transparent conductive material as shown in FIG. 2.

Figure 5:
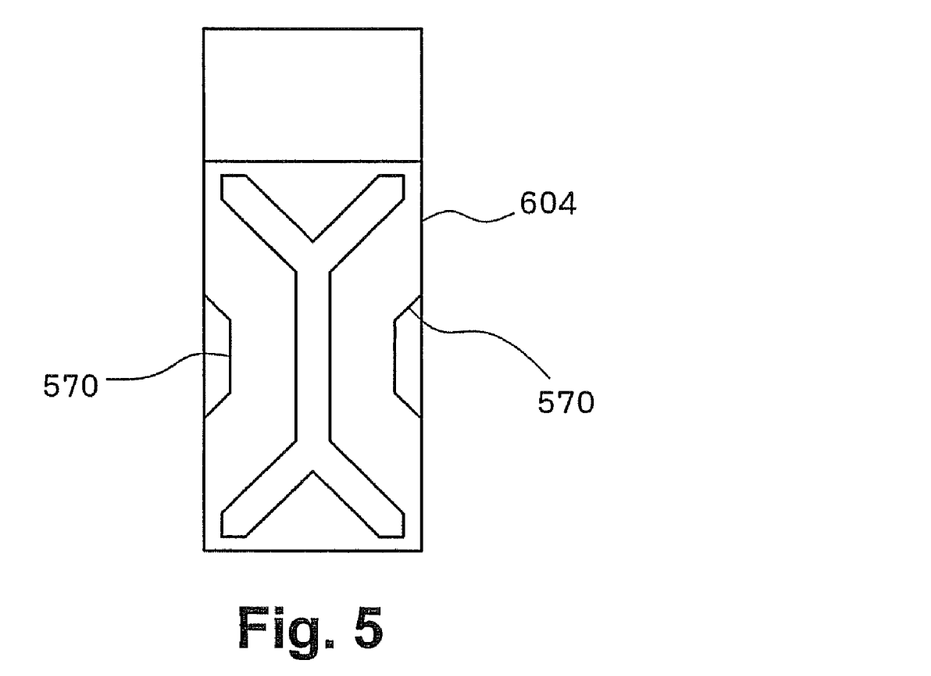
FIG. 5 is a diagram for explaining a planar structure of a pixel of a liquid crystal display device according to yet another preferred embodiment of the present invention.
Figure 6:
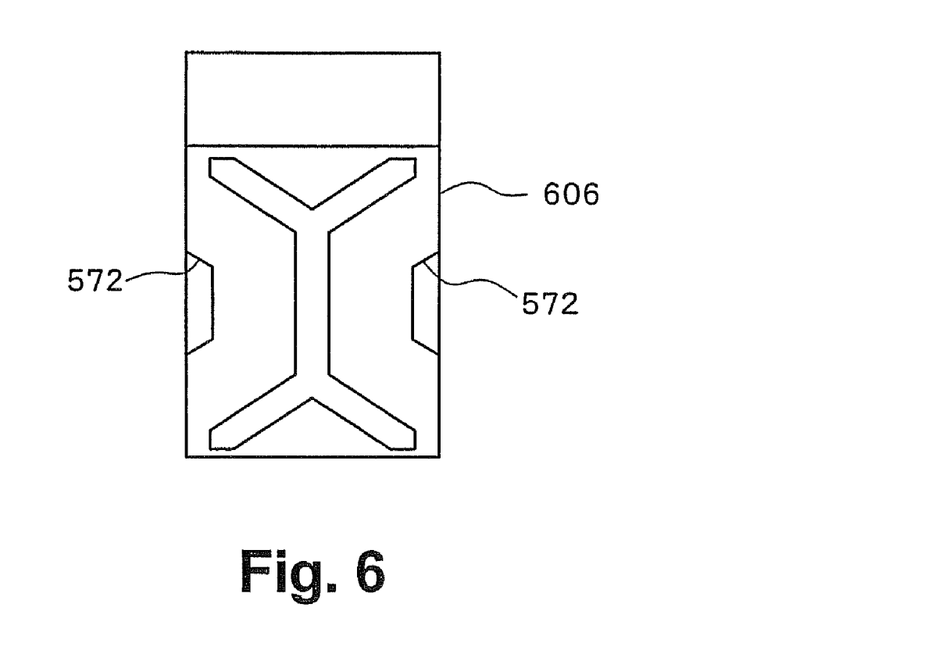
FIG. 6 is a diagram for explaining a planar structure of a pixel of a liquid crystal display device according to another preferred embodiment of the present invention.

FIGS. 5 and 6 show another shape of a pixel. A pixel 604 (first electrode 200) of FIG. 5 has a shape identical to that of the pixel 600 (first electrode 200) of FIG. 3A except for the shape of the additional orientation controller. In the example configuration of FIG. 5, an additional orientation controller 570 has a trapezoidal shape, with a height being 3 μm similar to the triangular cutout portion. The height of the trapezoid may alternatively be set at 5 μm. The length (length of the base) of the trapezoid is, for example, 37 μm. The length of the upper side is set to be shorter than the base of the trapezoid so that the tilted sides of the trapezoid form angles similar to the V-shaped portions of the orientation controller 510.

In the configuration of FIG. 6, a pixel 606 (first electrode 200) has a shape identical to that of the pixel 602 (first electrode 200) of FIG. 4 except for the shape of the additional orientation controller. A difference from the pixel 602 of FIG. 4 is that an additional orientation controller 572 has a trapezoidal shape. The height of the trapezoid is 3 μm similar to the triangular cutout portion, but alternatively the height may be set to 5 μm. The length (length of the base) is 27 μm. In the configuration of FIG. 6 also, the tilted sides of the trapezoid are preferably parallel to the direction of extension of the sides of the V-shapes of the orientation controllers which oppose the tilted sides. With such a trapezoidal shape also, the disclination can be prevented. In the case of the trapezoidal shape, the upper side of the trapezoid and the linear portion of the orientation controller are approximately parallel, and thus there is an advantage that the alignment of the liquid crystal between these sides tend to match. The trapezoidal shape, on the other hand, reduces the aperture ratio because the reduction in the electrode area is large. The selection of the triangular shape or the trapezoidal shape and setting of the size such as the height are determined considering the desired aperture ratio and the degree of disclination that actually occurs.

As described, in the above-described embodiments, in addition to the orientation controller which divides the pixel region, an additional orientation controller is placed at an approximate center of a longest edge of the sides of the original pixel region, among the edges of the divided regions. This portion is furthest away from the orientation controller (electrode-absent portion) formed by the boundary of the pixels and orientation controller (projection) which divides a pixel into a plurality of alignment regions. In addition, the alignment directions determined by these orientation controllers tend not to match in this portion, and are thus unstable. In the above-described embodiments, an additional orientation controller is provided in this portion in order to stabilize the alignment and improve the image quality. In addition, because the additional orientation controller is present, the alignment direction around the center in the long-side alignment region can be defined, not only is the image quality improved, but also the responsiveness of liquid crystal in the long-side alignment region is improved.

In the above-described embodiments, configurations are shown in which the additional orientation controller is provided only on the long-side alignment region 630, but the additional orientation controller may be additionally provided in the lower-side region 460 and the upper-side region 650.

What is claimed is:

1. A liquid crystal display device comprising a first substrate having a first electrode and a second substrate having a second electrode in which surfaces of the first substrate and the second substrate on which the first electrode and the second electrode are formed are placed opposing each other with a liquid crystal layer therebetween, wherein each pixel region has a shape of a polygon, comprises an orientation controller which controls an alignment direction of liquid crystal, and is divided into a plurality of alignment regions by the orientation controller, and in an alignment region having an end matching an end of the pixel region among the plurality of alignment regions, an additional orientation controller is provided on the end of the pixel region; the first electrode has an individual pattern corresponding to each shape of the pixel region;

the orientation controller comprises a first portion extending toward the long side of the first electrode at a first angle to the long side of the first electrode, a second portion extending toward the long side of the first electrode at a second angle different from the first angle to the long side of the first electrode, and a connecting portion connecting the first portion and the second portion;

the additional orientation controller comprises an end of the first electrode which is formed by cutting out the outer edge of the first electrode;

the additional orientation controller is provided in an area defined by the orientation controller and an outer edge of the first electrode, and controls alignment direction of liquid crystal into the approximately same direction which the first and second portion of the orientation controller controls into;

the additional orientation controller does not overlap the connecting portion of the orientation controller; and the length of the additional orientation controller in the direction of a short side of the first electrode is shorter than half the length of the short side of the first electrode.

2. A liquid crystal display device according to claim 1, wherein
the second portion is inclined at the second angle forming a linear symmetry with respect to the first portion.

3. A liquid crystal display device according to claim 1, wherein
the additional orientation controller has a linear symmetric shape whose axis is the axis of linear symmetry of the first portion and the second portion.

4. A liquid crystal display device according to claim 1, wherein the additional orientation controller is formed at an approximate center position of the end of the pixel region forming a part of at least one of the alignment regions.

5. A liquid crystal display device according to claim 1, wherein the cutout pattern of the additional orientation controller is triangular.

6. A liquid crystal display device according to claim 1, wherein the cutout pattern of the additional orientation controller is trapezoidal.

* * * * *